United States Patent

[11] 3,619,071

| | | | | |
|---|---|---|---|---|
| [72] | Inventor | Tsutomu Kimura<br>Ashigara-Kamigun, Japan | [51] | Int. Cl. ............................................. G01j 1/42,<br>G01d 5/36 |
| [21] | Appl. No. | 854,467 | [50] | Field of Search ................................ 356/222,<br>201, 202, 158; 250/232 |
| [22] | Filed | Sept. 2, 1969 | | |
| [45] | Patented | Nov. 9, 1971 | | |
| [73] | Assignee | Fuji Photo Film Co., Ltd.<br>Ashigara Kamigun, Kanagawa, Japan | [56] | References Cited<br>UNITED STATES PATENTS |
| [32] | Priority | Sept. 10, 1968 | 3,096,176 7/1963 Craig ........................... 356/202 X |
| [33] | | Japan | 3,102,450 9/1963 Grossmann ................. 356/202 X |
| [31] | | 43/65149 | |

Primary Examiner—Ronald L. Wibert
Assistant Examiner—Conrad Clark
Attorney—Sughrue, Rothwell, Mion, Zinn & Macpeak

[54] PHOTOGRAPHIC-GRADATION-MEASURING DEVICE
5 Claims, 6 Drawing Figs.

[52] U.S. Cl. ................................................ 356/222, 250/232

ABSTRACT: A mosaic of photosensitive elements acts in conjunction with a photochopper to provide a varying electrical signal indicative of the gradation contrast of a photographic negative image projected on the elements.

PATENTED NOV 9 1971
3,619,071
SHEET 1 OF 3
FIG. 1
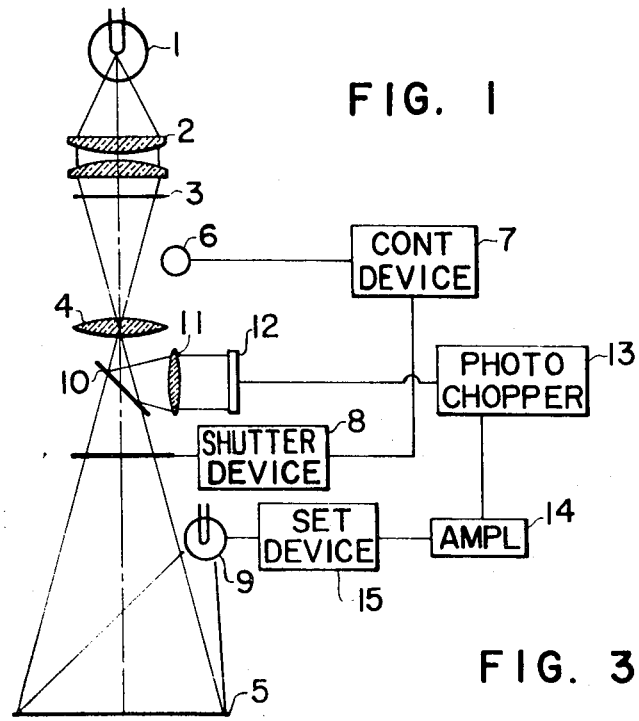
FIG. 2
| $S_{11}$ | $S_{21}$ | $S_{31}$ | ----- | $S_{m1}$ |
|---|---|---|---|---|
| $S_{12}$ | $S_{22}$ | $S_{32}$ | ----- | $S_{m2}$ |
| $S_{13}$ | $S_{23}$ | $S_{33}$ | ----- | $S_{m3}$ |
| | | | | |
| $S_{1n}$ | $S_{2n}$ | $S_{3n}$ | ----- | $S_{mn}$ |
FIG. 3
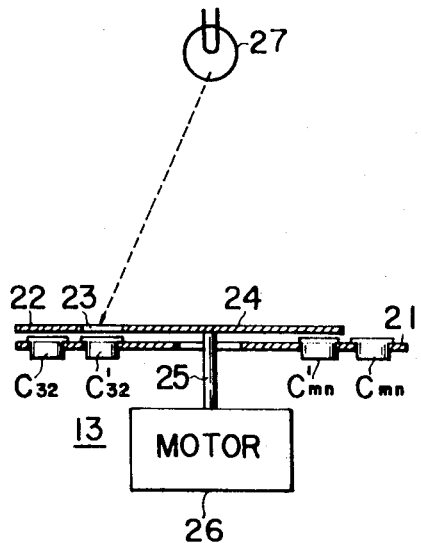

PHOTOGRAPHIC-GRADATION-MEASURING DEVICE

BACKGROUND OF THE INVENTION

1. Field of the Invention

The present invention relates to a device for measuring the photographic image gradation contrast, and in particular to a device for measuring the negative image gradation for making a positive image print of best gradation from negative images of varying gradation by providing a proper preexposure of the photographic paper according to the image gradation contrast of the individual negative.

2. Description of the Prior Art

In the prior art, in order to obtain a positive image of the best gradation from negatives of varying gradation the gradation contrast of each negative image is judged by the operator's eyes and by such judgement, the proper kind of photographic paper is selected among papers of various gradation or by providing a subexposure or preexposure the best gradation of the positive image is obtained.

SUMMARY OF THE INVENTION

In accordance with the present invention, the gradation contrast of the negative image is not judged by the operator, but in contrast is judged by electronic means wherein the optical density at the several positions in the negative image is electronically detected and the detected density of the image is converted to an electrical output representing the gradation contrast.

The present invention provides a device for judging the photographic gradation of the negative image in order to obtain a good gradation in the positive image formed therefrom.

BRIEF DESCRIPTION OF THE DRAWINGS

FIG. 1 is a partial block diagram and schematic view of a control system for a photographic printing device utilizing the photographic-gradation-judging device in accordance with the present invention;

FIG. 2 is a front view showing the arrangement of the density detectors on the focusing plane in accordance with the present invention;

FIG. 3 is a vertical, partly sectional, view showing the main construction of the photochopper employed in the present invention;

DESCRIPTION OF THE PREFERRED EMBODIMENT

Figure 4:
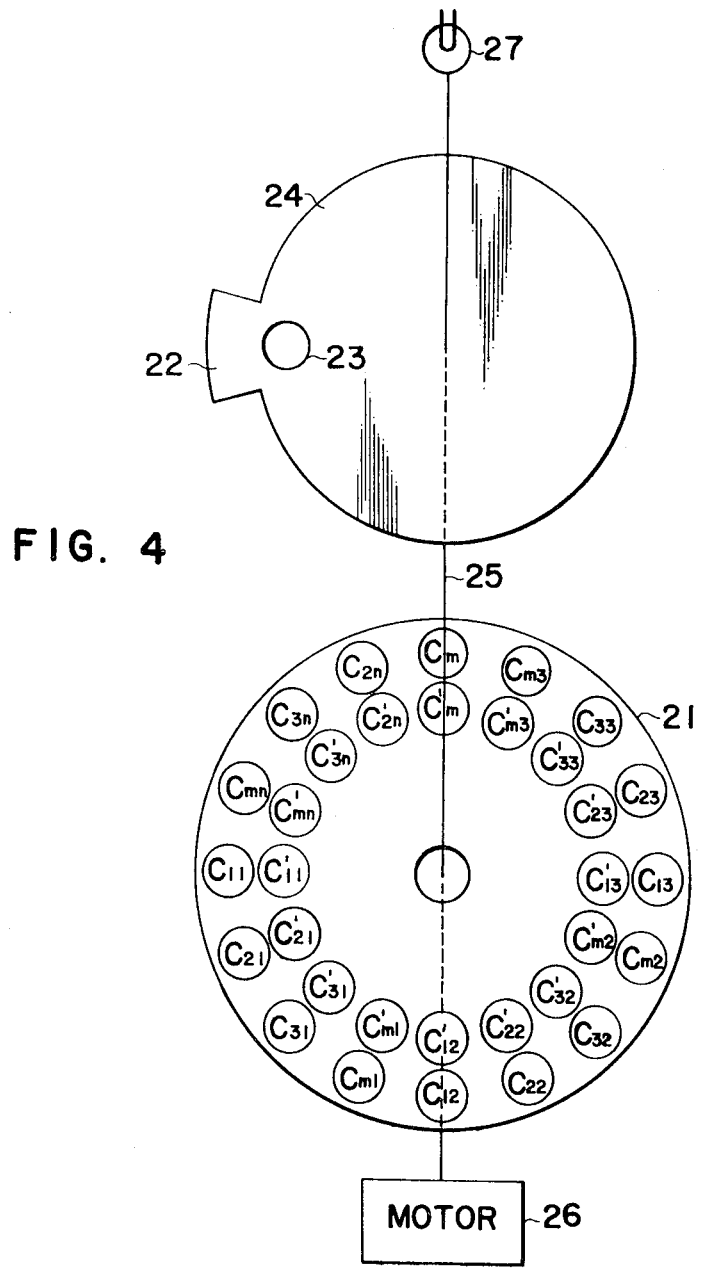
FIG. 4 is a broken plan view of the photochopper shown in FIG. 3.

Now, referring to FIG. 1, which shows the photographic-gradation-judging device in accordance with the present invention employed in a conventional automatic exposure-controlled photographic printing apparatus, light from the light source 1 is concentrated by a condenser lens 2 and directed onto the negative film 3. The transparent light image of the negative 3 makes an image on a photographic paper surface 5 which is exposed for printing by a focusing lens 4. The dispersed light transmitted through the negative 3 is received by a light receptor 6 for detecting the exposure value. The received light is converted into photocurrent form and fed to an integrating control device 7. When the integrated value of the photocurrent reaches the predetermined and set value, that is when the correct exposure is achieved by the open shutter, the shutter device 8 closes and the exposure comes to an end. And as needed, a subexposure or preexposure is provided by a subexposure lamp 9. The construction and operation described so far are of conventional exposure control photographic printing device.

In addition to the above construction, a half mirror or a semitransparent mirror 10 is provided in the light path, and a part of the light is removed from the light path and an image is obtained on focusing plane 12 for detection by condenser lens 11. A negative image is obtained. Then the density formation of the negative image is ascertained by a number of light receptors which detect the density of the image. The output information of density is in photocurrent form and provides an output signal for judging the image gradation contrast of the negative through a photochopper 13 and an amplifier 14. The output signal controls the subexposure or preexposure setting device 15 and causes the preexposure lamp 9 to provide the set amount of preexposure.

Thus, the photographic-gradation-judging device in accordance with the present invention mainly consists of a number of detecting photoelements arranged on a focusing plane coupled to a photochopper and an amplifier.

The light receptors or photoelements on the focusing plane 12 are arranged as shown in FIG. 2 wherein the elements are uniformly distributed all over the focusing plane device, in lines and rows ($S_{11}S_{12}S_{13}....S_{1n}, S_{11}S_{21}S_{31}....S_{ml};....S_{mn}$).

An example of the photochopper is shown in FIG. 3, by sectional view, and in FIG. 4 by plan view, wherein photoconductive elements ($C_{11}....C_{mn}$, $C'_{11}....C'_{mn}$) such as CdS are fixed to a stationary disk 21. The elements are arranged in a double circle. Another disk 24 has an aperture 23 near the periphery of the disk 24 and a radially extended peripheral sector portion 22 adjacent aperture 23, is provided coaxially with the disk 21. The shape of the plate 21 may not be necessarily circular but may be rectangular or any other shape. The center of the disk 24 is fixed to the rotatable shaft 25 of the motor 26 and extends through plate 21. Above the photochopper 13 a lamp 27 is provided to irradiate the photoconductive elements ($C_{11}....C_{mn}$, $C'_{11}....C'_{mn}$) disposed on the plate 21. When the motor is driven, the disk 24 rotates and the light from the light source 27 is chopped by the radially extended peripheral portion 22 of the disk 24 so that the photoconductive elements ($C_{11}....C_{mn}$) are alternately cut off from the light source 27. And on the other hand, the aperture 23 of rotatable disk 24 transmits the light from the light source 27 onto the photoconductive elements ($C'_{11}....C'_{mn}$) alternately. Thus, the photoconductive elements C and C' of corresponding positions such as $C_{11}$ and $C'_{11}$, $C_{12}$ and $C'_{12}$,...$C_{mn}$ and $C'_{mn}$, are synchronized in being lit and cut off from the light. That is, when the light is irradiated onto the photoconductive element $C_{mn}$, the light normally passing onto the photoconductive element $C'_{mn}$ is intercepted. Thus, the pair of the corresponding photoconductive elements C and C' form a photochopper.

Figure 6:
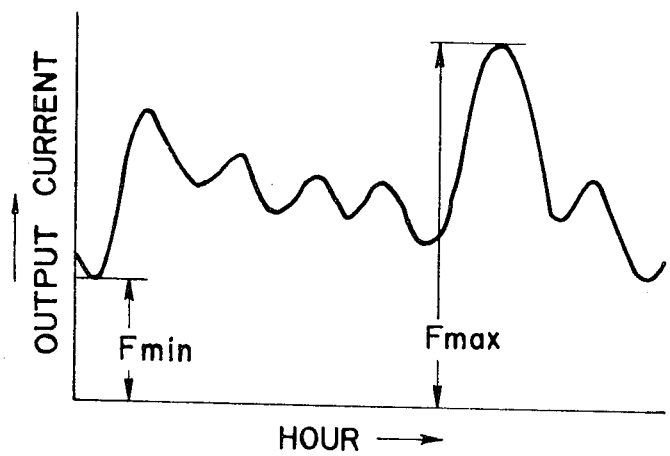
FIG. 6 is a diagram showing the output wave shape of the photographic-gradation-judging device in accordance with the present invention.

Therefore, by connecting the light-receiving elements ($S_{11}S_{12}...S_{1n}, S_{11}S_{21}...S_{ml},....S_{mn}$) for detecting the density on the focusing plane 12 with the photochopper 13, the respective portions of the negative image on the focusing plane 12 are naturally scanned and the photocurrent proportional to the density of the image is chopped and fed into the amplifier 14. The output current wave shape is as shown in FIG. 6. The difference between Fmin and Fmax becomes the value of the gradation contrast of the negative image.

Figure 5:
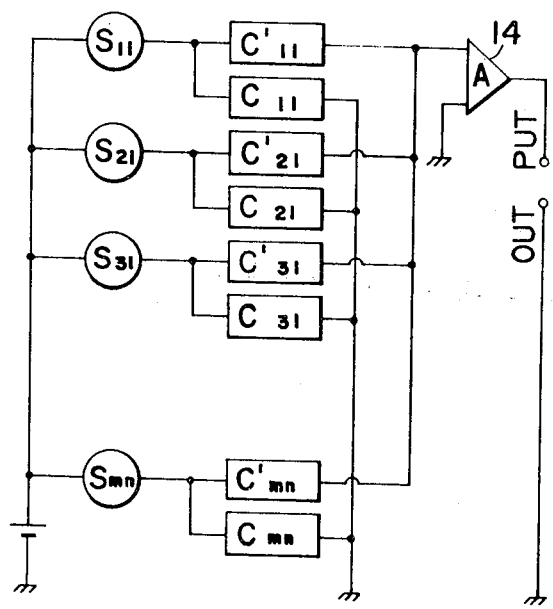
FIG. 5 is an electric circuit of the photographic-gradation-judging device.

The electric circuit for the photographic-gradation-judging device in accordance with the present invention is shown in FIG. 5. The photocurrent from the light-receiving elements ($S_{11}...S_{mn}$ for detecting the density flows alternately through the photoconductive elements ($C_{11}...C_{mn}$) arranged on the outer circle on the photochopper 13 and the elements ($C'_{11}...C'_{mn}$) arranged on the inner circle, and is taken out as the output current wave as shown in FIG. 6. The value of the gradation contrast of the negative image is delivered through amplifier 14.

This output current wave can be utilized as it is, but may be converted into a direct current output so as to be readily shown by a meter. In the case that the preexposure corresponding to the image gradation contrast is provided as shown in FIG. 1, the output current wave shape from the amplifier 14 or the output from the photographic-gradationjudging device such as the difference between Fmin and Fmax in FIG. 6 is transmitted to the preexposure lamp 9 as an amplified direct current output through the preexposure setting device 15 so that the correct preexposure which makes a positive image of the correct gradation contrast is directed onto the photographic paper surface 5.

Since the optical density all over the negative-type image is scanned and detected, and the difference in density or the gradation contrast of the negative image is ascertained as an electric output, in accordance with the present invention, the judgment of the gradation contrast can be much more rapidly and precisely conducted in comparison with the conventional art wherein the operator observes the contrast of the image with his eyes. Besides, since the output can be ascertained electrically, it is very easily utilized as input to various other control systems.

What is claimed is:

1. A photographic-gradation-judging device comprising: a photochopper inducing:
    a fixed plate carrying a number of photoconductive elements thereon and arranged in a double circle;
    a light for illuminating said photoconductive elements; and
    a disk rotatably disposed in coaxial relationship with said fixed plate, said disk having a radially offset aperture and light-intercepting portion for intercepting the light directed on said double circle of photoconductive elements;
planar detection means comprising a number of light-receiving photoelements for detecting the density of an overall photographic image illuminating the same, means electrically connecting respective image-receiving photoelements to said photoconductive elements, and an amplifier operatively connected to said photoconductive elements to provide an output indicative of image gradation contrast.

2. The photographic gradation judging device as claimed in claim 1, wherein said photoelements consist of a matrix of photoconductors and said device further includes a source of voltage electrically connected to said photoconductors.

3. In a photographic reproduction system including a negative, a light source for illuminating said negative, means for focusing the negative image therefrom onto a positive photographic paper, means for subexposing said paper, and a shutter for controlling the exposure of said negative onto said paper, the improvement comprising: a photographic-gradation-judging device including a photochopper having a fixed plate carrying a number of photoconductive elements thereon, a light for illuminating said photoconductive elements, a rotatable chopper disk for selectively intercepting the light directed onto said photoconductive elements, a matrix of light-receiving photoelements, means for photographically projecting an image from said negative onto said matrix of light-receiving photoelements for detecting in selective image areas, the density of the overall image, means for electrically connecting individual image light-receiving elements of said matrix to respective photoconductive elements of said photochopper, whereby the output of said photoconductive elements of said chopper provides an electrical signal indicative of the image gradation contrast, said system further including amplifier means for delivering the output signal from said photoconductive elements to said subexposure means.

4. A photographic reproduction system as claimed in claim 3 wherein said photoconductive elements are carried by said fixed plate of said photochopper arranged in a double circle, and said rotatable disk carried by said photochopper is disposed in coaxial relationship with said fixed plate, with said disk having a single radially offset aperture and a light-intercepting sector portion for selectively transmitting or intercepting light directed toward said double circle of photoconductive elements.

5. The system as claimed in claim 3 wherein said matrix of photoelements consists of a plurality of photoconductors and said system further includes a source of voltage electrically connected to said matrix photoconductors.

* * * * *